United States Patent [19]
Chung

[11] Patent Number: 5,882,263
[45] Date of Patent: Mar. 16, 1999

[54] AUDIO-VIDEO-COLORFUL MULTIMEDIA SYSTEM FOR BOWLING ALLEYS

[76] Inventor: Te-Heng Chung, No. 183 Ming-Chu Road, Tao-Yuan City, Tao-Yuan Hsien, Taiwan

[21] Appl. No.: 575,737

[22] Filed: Dec. 18, 1995

[51] Int. Cl.⁶ ..................................................... A63B 71/06
[52] U.S. Cl. .............................. 463/70; 463/54; 340/323
[58] Field of Search ................................. 473/54, 67, 70, 473/115; 340/323

[56] References Cited

U.S. PATENT DOCUMENTS

| | | | |
|---|---|---|---|
| 3,257,898 | 6/1966 | Webb | 473/54 |
| 4,339,129 | 7/1982 | Gautraud | 473/67 |
| 5,118,105 | 6/1992 | Brim et al. | 473/54 |
| 5,523,736 | 6/1996 | Gosselin et al. | 473/54 |

*Primary Examiner*—Jessica Harrison
*Attorney, Agent, or Firm*—Bucknam and Archer

[57] ABSTRACT

An audio-video-colorful multimedia system for bowling alleys, comprises screens lined above the alleys, a main controlling computer to control an animation display system, and through a down-converter and a projector, the pictures or advertising words can be displayed on the screen. When bowling starts, the animation display system displays words and patterns to indicate the bowlers' movements. And through the reading of a bowler-read interface and a score-read interface, animated pictures of status of blowing and strikes are displayed in time. In cooperation with a sound-read interface, corresponding sounds and audio effect are heard. Further, in accordance with the number of strikes, the speed of flash lights disposed on the alleys is controlled so as to produce a three-dimensional effect including picture, lighting, and audio effect.

4 Claims, 9 Drawing Sheets

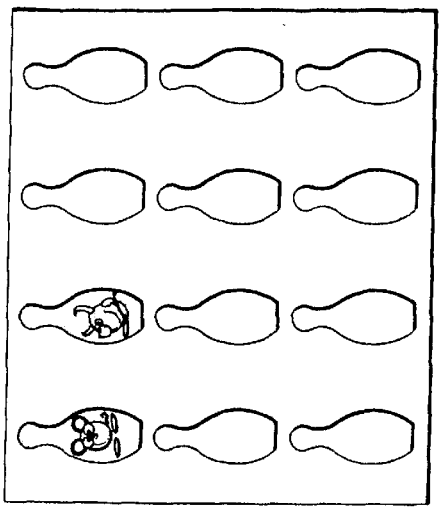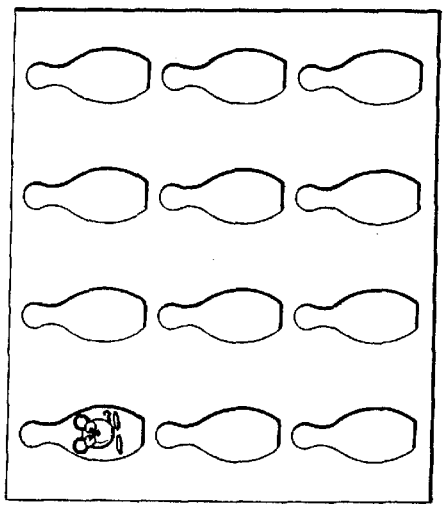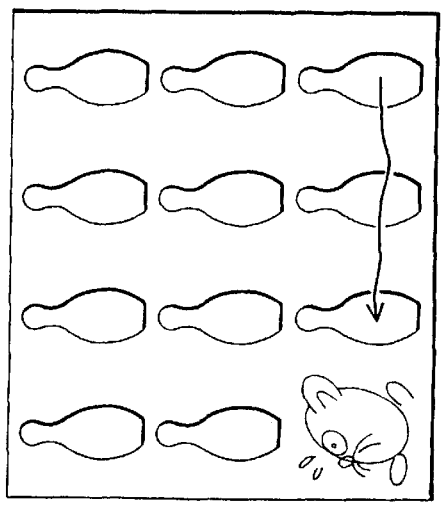
FIG. 9

AUDIO-VIDEO-COLORFUL MULTIMEDIA SYSTEM FOR BOWLING ALLEYS

FIELD OF THE INVENTION

The present invention relates to an audio-video-colorful multimedia system for bowling alleys, particularly to bowling alleys equipped with a system of picture, lighting, and audio effect so as to bring about synergism of amusement and fun.

Owing to creation and accumulation of social wealth, and the influence of world fashion and trend, besides their work people are gradually attaching importance to life quality and leisure activities. Examples are bowling, tennis, swimming, mountain climbing, and camping, etc. Particularly, people who live in urban areas are devoted to bowling which brings about both sporting and leisure effects.

Nowadays bowling halls are normally equipped with scores of bowling alleys, where a score board is placed at the starting area of the bowling alley, and an automatic pinsetter is mounted at the end of the bowling alley for automatically setting the pins. For the sake of appealing appearances and partitions, panels are provided in both the front of the automatic pinsetter and the upper side of the end of the bowling alley, so as to hide the machinery facilities such as the automatic pinsetter. Except for this purpose, the panels of great dimensions do not have any other utility, and it is a flaw that mars perfection.

In addition, other than the score boards, the bowling alleys do not possess animated pictures, words, sound to show the motions of bowlers. Nor the animated status of pins, strike, score, and lighting effect. These greatly reduce added values, amusement, and fun, and thus annoying the bowlers and those who engage in bowling business, due to failure to improve the quality of services even through much efforts have been made.

In view of amusement and fun reduction owing to lack of cooperation with animated pictures lighting and audio effect at the bowling alleys, the inventor endeavored to solve the problem by pursuing several analyses and tests. In the long run, an audio-video multimedia system for bowling alleys is accomplished.

The object of the present invention is to provide an audio-video-colorful multimedia system for bowling alleys, where pictures of natural scenes or advertising words are displayed prior to play, and when the play is to be started, words and animated pictures indicating movements of the bowler are shown. Further, animated pictures for the status of play or strike, and those for latest score are displayed in time. Meanwhile, in cooperation with sound and video effect, and in compliance with the number of strikes, frequency of light flashes is controlled. Therefore, synergetic effect of amusement and fun results from picture, lighting, and video effect, so as to improve service quality and value, thereby to meet the actual requirement.

For achieving the above object, the technical measure adopted and the efficacy of the present invention are described in more detail by accompanying the drawings so that the structure of the invention can be fully understood.

FIG. 9 is a schematic view showing an animated picture of strike; and

Figure 1:
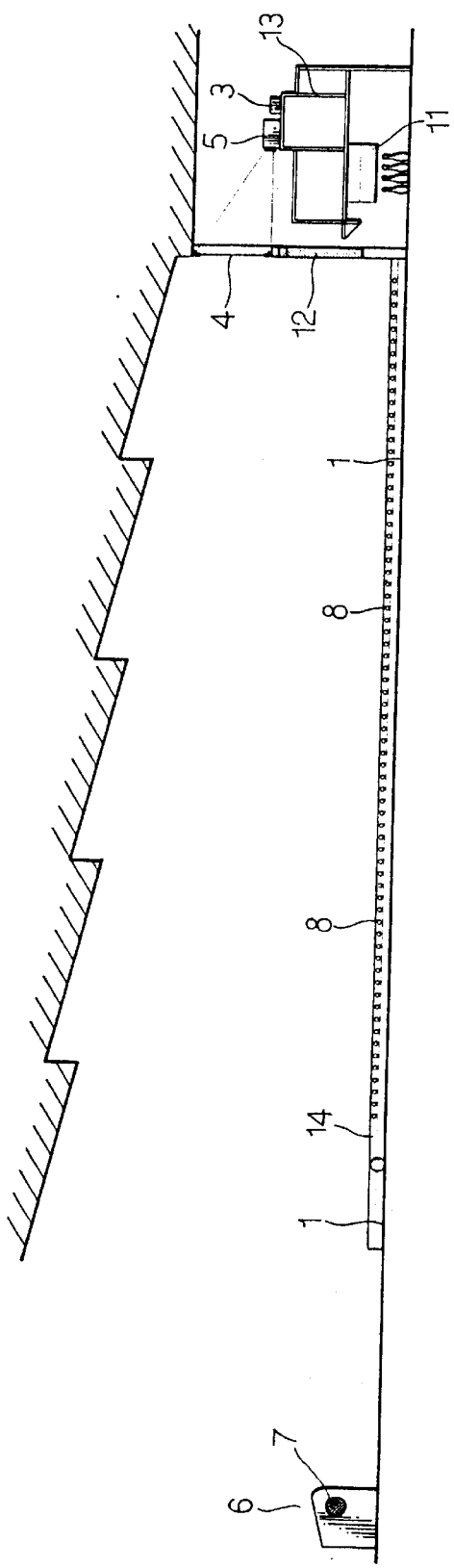
FIG. 1 is a schematic view of the present invention.

As shown in FIG. 1, the present invention "Audio-Video-Colorful Multimedia System for Bowling Alleys" is carried out by designing on the alleys 1. Each alley 1 is at the end arranged with a pinsetter 11 at its end to set the pins automatically. At the upper portion of the end of the alley 1, and in front of the pinsetter 11, through panels 12 are laterally positioned to hide machinery facilities such as the pinsetter 11. Further, a screen 4 (hard type) is mounted at the space between the ceiling of the bowling hall and the through panels 12. The screen 4 is placed at the upper portion of the end of the alley 1. The frame 13 of the pinsetter 11 is provided with a pair of projectors 5 facing to each other. Each projector 5 is arranged with a screen 4. The central processing unit 3 of an animated-pictures displaying system is disposed beside the projector 5. Each projector 5 is arranged with a central processing unit 3 to display prepared images, advertisement, words, and animated pictures for sight or for indicating the bowlers' movements.

A score board 6 is provided in front of each alley 1. The score board 6 can display the score of each bowl and the status of the pins being fallen. Since the score board 6 relate to known techniques, its theory and function are not described herein.

Figure 10:
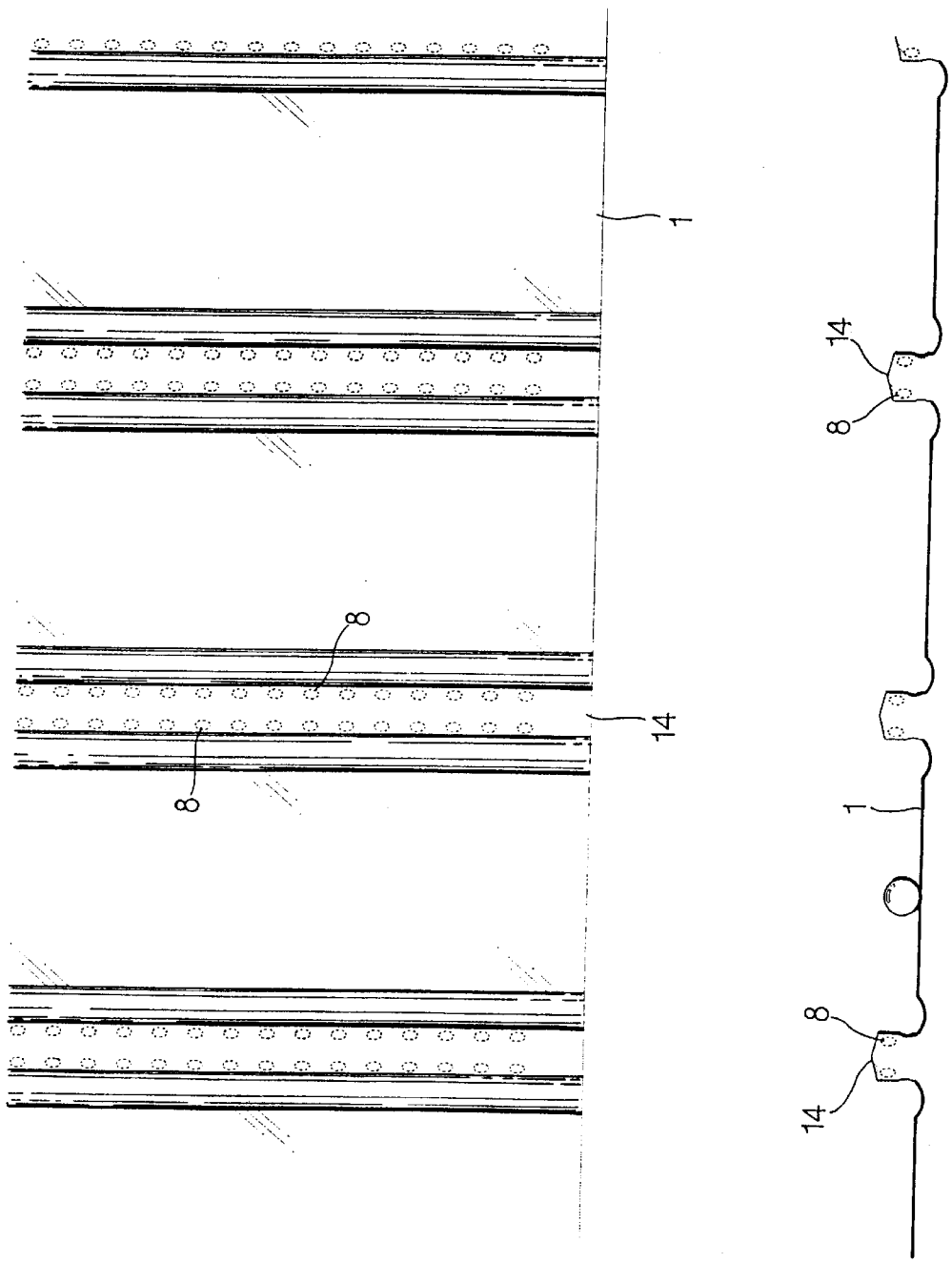
FIG. 10 is a schematic view showing the lighting arrangement at the alleys.

The alleys 1 are separated from each other by a protruded isolating partition 14. There are alley lights 8 lined up on each side of the isolating partition 14 (see FIG. 10). The score board 6 is provided on both sides with speakers 7 to amplify the prepared sound to the bowlers.

Figure 2:
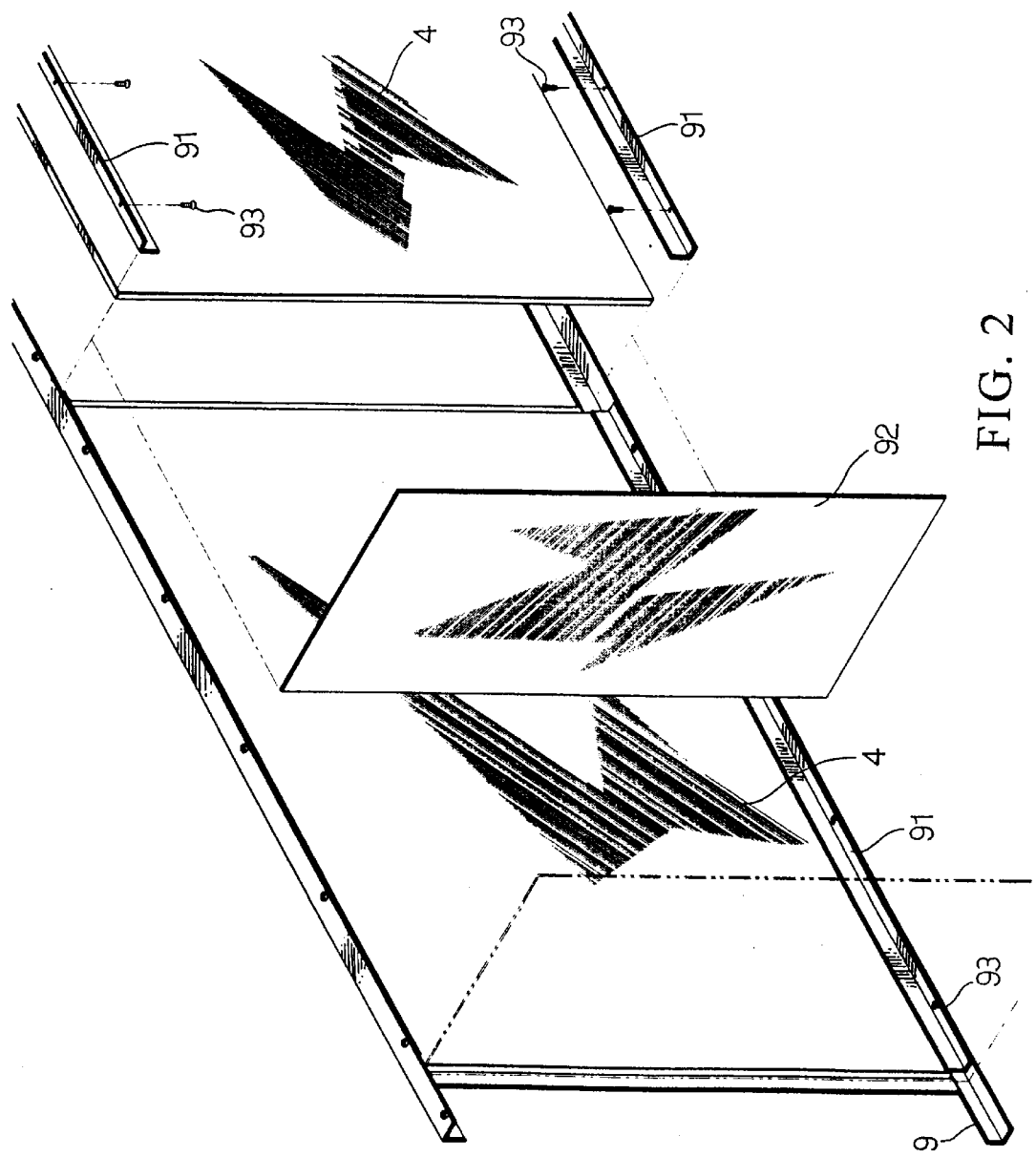
FIG. 2 is a perspective exploded view showing a screen combination according to the present invention.

As shown in FIG. 2, Each screen 4 is mounted on a frame 9 which is laterally extended and is equidistantly spaced by longitudinally extended panels 92 so as to form predetermined spacings. Each spacing contains a screen 4 which is then secured on the frame 9 with upper and lower plates 91 pressing on the screen 4 and with screw 93 fastening the screen 4 on the frame 9.

Figure 3:
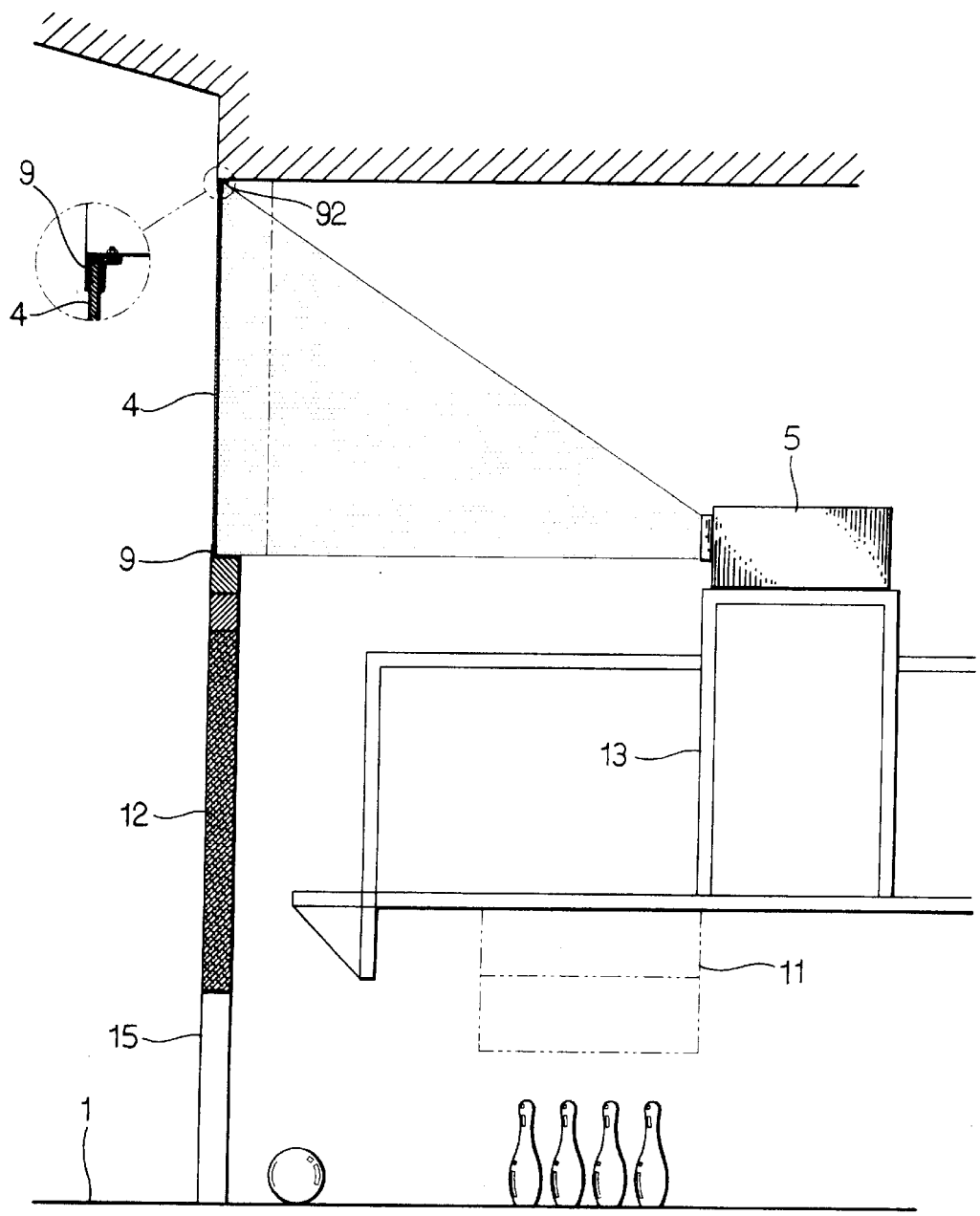
FIG. 3 shows a side view of the screen combination according to the present invention.

As shown in FIG. 3, a plate 12 is secured by a supporter 15 which is positioned between adjacent alleys 1. The frame 9 of the screen 4 is at the top fixed to the ceiling of the bowling hall, and the bottom end of the frame 9 is fixed on the plate 12. Each screen 4 faces a projector 5. And the light-shutting panels 92 can prevent the light emitted by the projectors 5 from interfering with each other.

Figure 4:
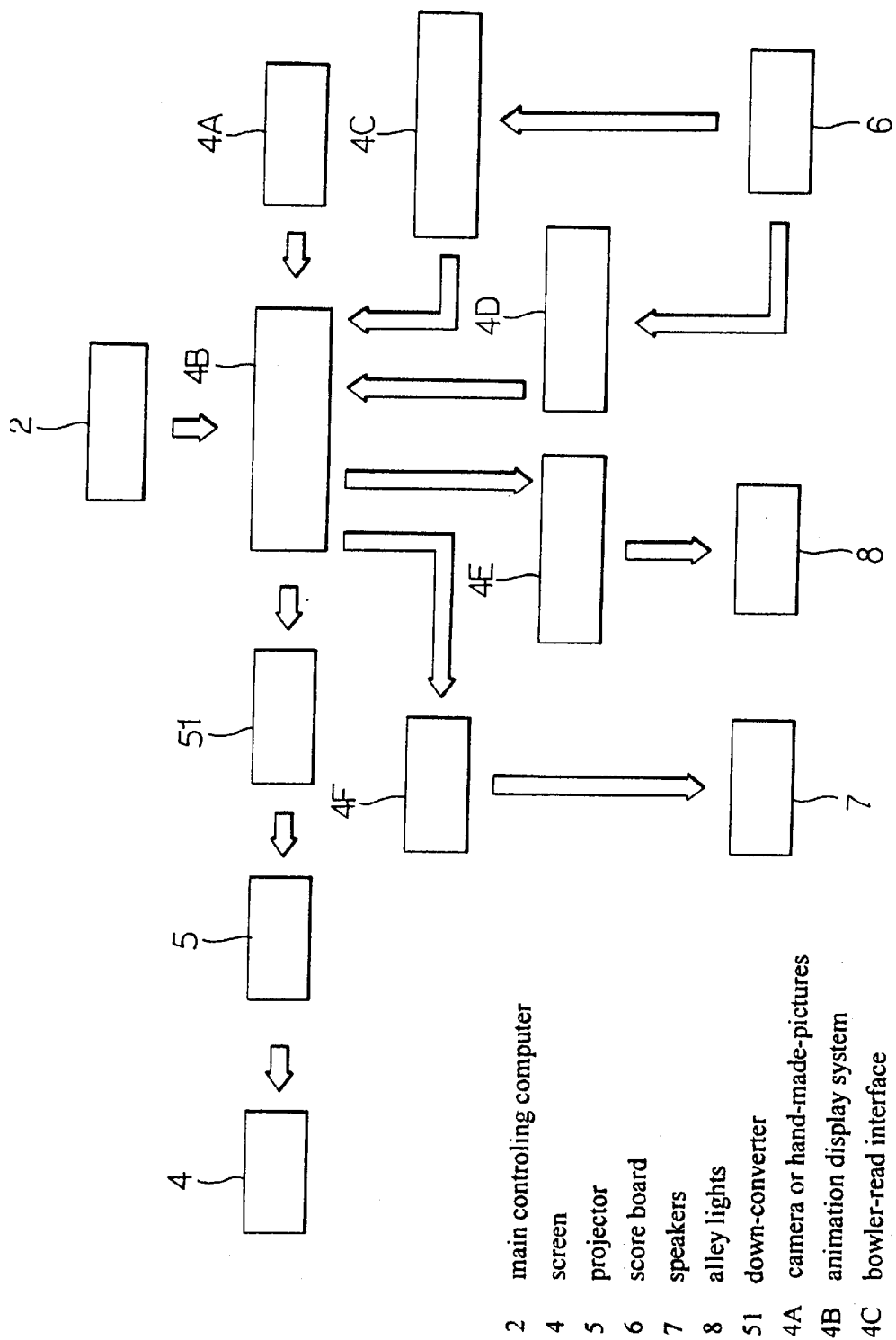
FIG. 4 is a block diagram of the present invention.
Figure 5:
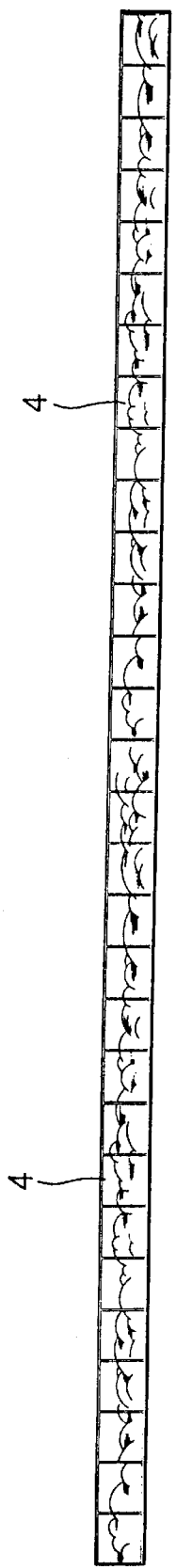
FIG. 5 shows a schematic view (1) of a screen display according to the present invention.
Figure 6:
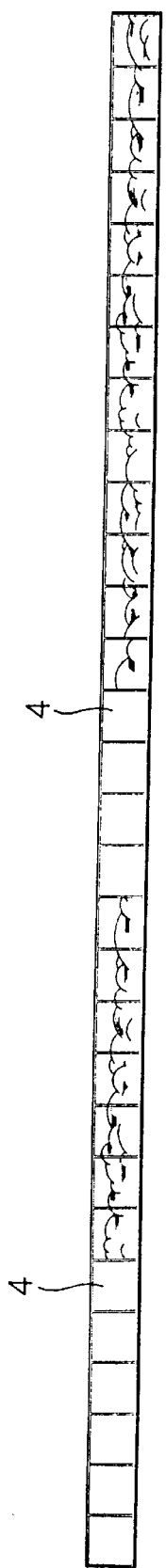
FIG. 6 shows a schematic view (2) of the screen display according to the present invention.

Now referring to FIG. 4, a main controlling computer 2 can be disposed on a place near counter and is operated by the operator. The controlling computer 2, prior to bowling, can display on the screen 4 the prepared images, animated pictures, or advertising words via the animation display system provided at each alley. As shown in FIG. 5, each screen displays natural scenes prior to bowling so as to heap up the atmosphere of the actual spot. As shown in FIG. 6, part of the screen 4 can display advertising words.

Animation display system can display animated pictures which were pre-recorded in a hard disk. Among the animated pictures are: Welcome, Play, Urging to play, Status of Play, Interval, Leftover, Spare, Strike, etc. The down converter 51 can lower the computer system signal (32 KHZ) to NTSC color system signal (15 KH) which can be received by the projector 5, where the signal is then projected to the 84-inch screen 4 (hard screen) via the projector 5.

A bowler-read interface can read and identify, from the score board 6, various pin-fallen status, and transmit the same to the animation display system to show a status animation, or a strike animation, as the particular bowl deserves. A score readable interface can read and identify, from the score board 6, the total score of the bowler, and transmit the same to the animation display system to show the score being deserved.

The animation display system can identify the number of strikes which are then read by a flashlight interface so as to control the flashing and the frequency of the flashing of the alley lights 8. In case the first to the third bowls are strikes, the alley lights 8 flash slowly; and when the fourth to the six bowls are also strikes, the alley lights 8 flash in a fair speed; if still the seventh to the ninth are strikes, the alley lights 8 flash quickly; in case the tenth to the eleventh bowls are also strikes, the alley lights 8 flash more quickly; and if still, the twelfth bowl is a strike, the alley lights 8 flash super-quickly.

The animation display system pre-records in a hard disk sounds which comply with various animations, where the sounds are read by a sound interface and are then amplified and voiced to the bowler through a speaker 7.

Figure 7:
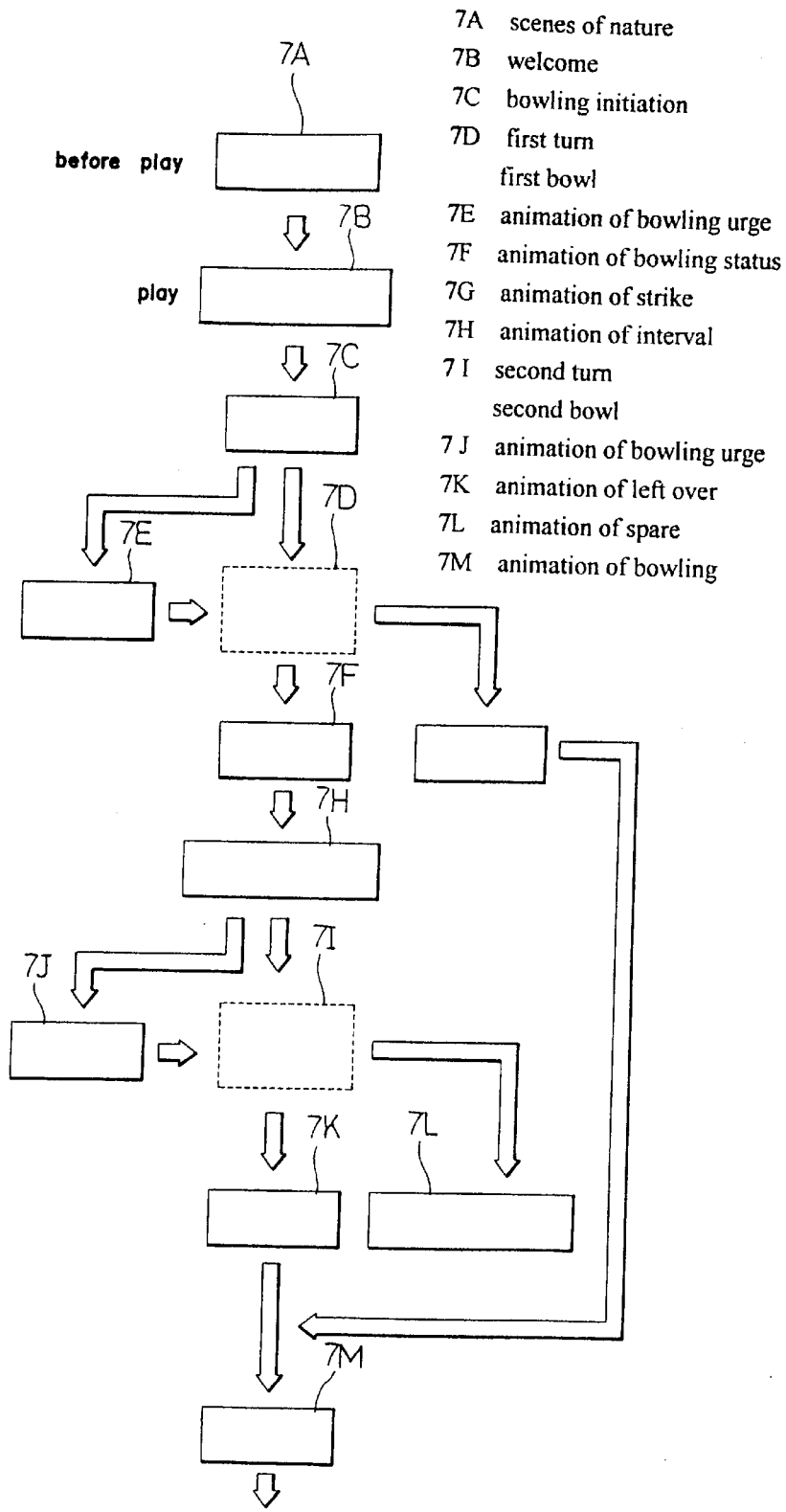
FIG. 7 shows a flow chart of the present invention.

As shown in FIGS. 1, 4 and 7, in the beginning each animation display system is controlled to display the scenes of nature. When starting bowling, the main controlling computer 2 selects an alley 1 so that its animation display system can run alone, while the other alleys 1 not yet played still maintain displaying the scenes of nature on the screen 4. The alleys 1 being played display on the screen 4, through the animation display system, animated pictures or words such as "Welcome", and then an animation of starting bowling to notify the bowler to play. If the bowler does not play the first bowl within 180 seconds, an animation of urging bowling will be displayed. After the first bowl, if it is a strike, an animation of strike will be displayed; otherwise, an animation of bowling status will be displayed. Then following an animation of interval, and of play. If within 180 seconds a bowl being not played, an animation of urging play is displayed. After the bolwer's second throw, an animation of the status of bowling, such as a leftover or a spare, will be displayed. Subsequently, an animation of the second turn of play appears. And the play goes on in order until it is over, then an animation of score will be shown through the animation display system.

In the embodiment of the present invention, each animation appears for six seconds. In case the next status of bowling takes place, the original picture will at once be stopped and the next picture interrupts. Various animations and the sounds complied therewith can appear synchronously.

Figure 8:
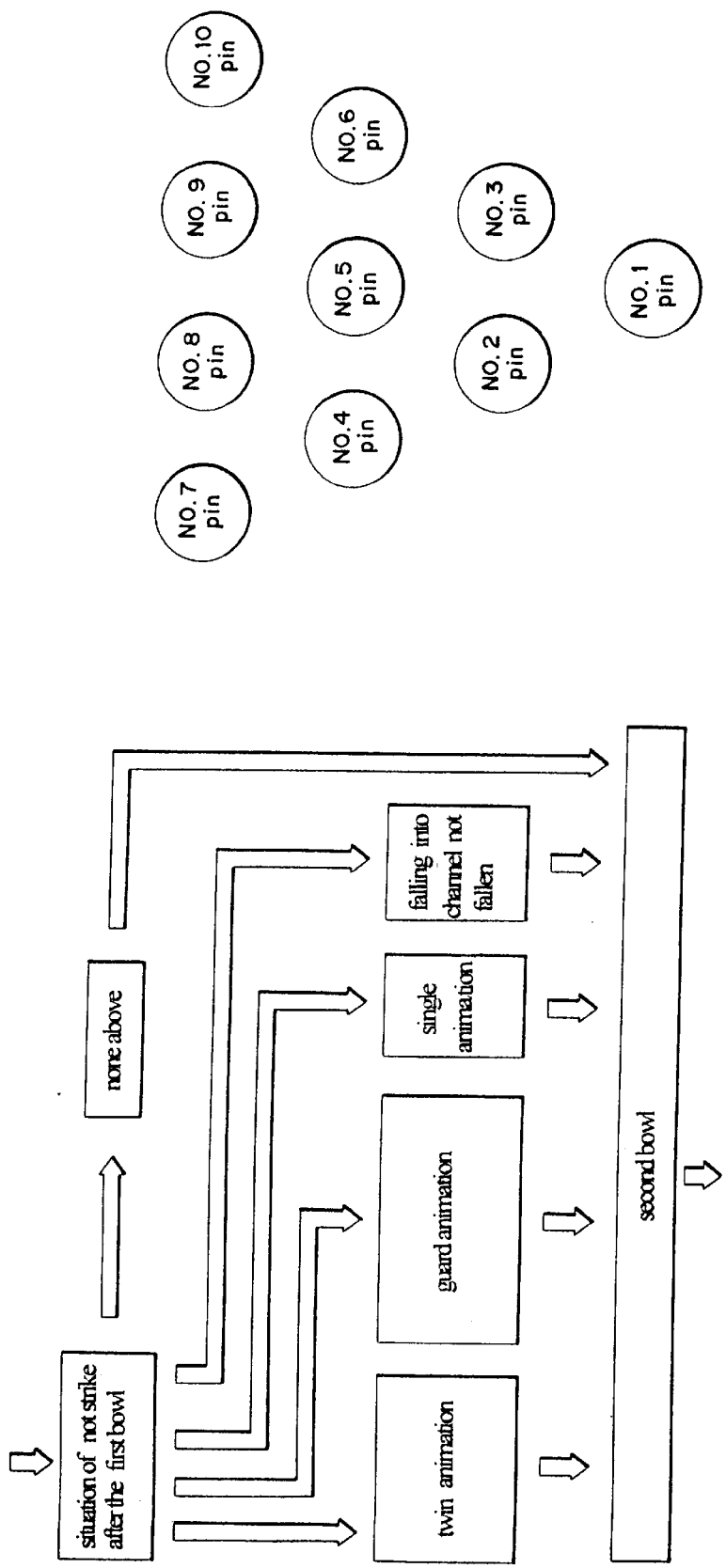
FIG. 8 shows a flow chart of status of play according to the present invention.

As shown in FIG. 8, the pins are numbered from 1 to 10. In case No. 1 and No. 5 pins, or No. 2 and No. 8 pins, or No. 3 and No. 9 pins, are left over after the first bowl, a twin animation showing the animation of bowling status will be displayed. In case No. 6 and No. 7, or No. 7 and No. 10, or No. 4 and No. 6, or No. 7 and No. 9, or No. 8 and No. 10, or No. 4 and No. 10, are left over, a guard animation showing the animation of bowling status will be displayed. In case only No. 7 or No. 10 is left over, a single animation showing the animation of bowling status will be displayed. However, if the bowl falls into the channel, an animation showing such a status will be displayed. For other status of bowling, an animation of none of the above will be displayed.

As shown in FIG. 9, the animated pictures according to the embodiment are presented with twelve kinds of animals, namely Rat, Ox, Tiger, Rabbit, Dragon, Snake, Horse, Sheep, Monkey, Chicken, Dog, and Boar. When a strike first occurs, the mouse appears, which then runs on bases and stops in position with a pattern; and when the second (successive) strike, the cow appears, which then runs on bases and stops in position with a pattern. The third strike and thereafter successively occur, which will follow in order and further description is omitted.

To sum up all the foregoing, the "Audio-Video-Colorful Multimedia System for Bowling Alleys" according to the present invention can, in cooperation with animated picture, lighting, sound (audio effect), produce synergistic effect of amusement and fun, so as to improve service quality and value, and to meet the practical need.

When the particular embodiment of the present invention has been illustrated and described, it would be obvious to those skilled in the art that various changes and modifications can be made without departing from the spirit and scope of the invention. It is therefore intended to cover in the appended claims all such changes and modifications that are within the scope of this invention.

What is claimed is:

1. An audio-video-colorful Multimedia system for bowling alleys, having a main controlling computer in command of various alleys or of particular alleys so that the multimedia means can carry out actions in accordance with the status of bowling and the program, the multimedia means of each alley comprising:

a screen, mounted above a far end of the alley;

a projector, disposed opposite to the screen and located at the rear of the screen;

an animation display system, including a CPU hard disk for pre-recorded various animated pictures, words and sounds, so that animated pictures are displayed on the screen through a down-converter and the projector according to the status of bowling;

a score board, located in front of the alley, for sensing and displaying the score of each bowl and the status of the fallen pins;

a speaker, provided beside the score board;

a sound interface, for reading the sound pre-recorded in the hard disk of the animation display system, the sound being audible from the speaker;

a bowler-read interface, for reading and identifying from the score board the status of the fallen pins, so that an animation of the status of bowling is displayed through the animation display system; and a score-read interface, for reading and identifying from the score board the total score of a whole run, so that a score animation is displayed through the animation display system.

2. The audio-video-colorful multimedia system for bowling alleys according to claim 1, wherein said animation display system is adapted to identify the number of strikes, and said multimedia system further comprises a flashlight interface and alley lights on both sides of the alley, said flashlight interface being adapted to read the number of strikes as identified by said animation display system and control the flashing and frequency of flashing of the alley lights based on the number of strikes read by the flashlight interface.

3. The audio-video-colorful multimedia system for bowling alleys according to claim 1, wherein said screen is arranged in a frame whose top is secured on the ceiling of the bowling hall, and whose bottom is secured on a plate which is secured on a supporter beside the alley.

4. The audio-video-colorful multimedia system for bowling alleys according to claim 3, wherein the frame extends laterally and is provided with longitudinally extending light-shutting panels laterally and equidistantly spaced, the light-shutting panels extending rearward so as to form predetermined lattice-like spacings each of which contains a screen, and upper and lower fixed plates are provided to secure each screen.

\* \* \* \* \*